(12) United States Patent
Okamura et al.

(10) Patent No.: US 7,192,268 B2
(45) Date of Patent: Mar. 20, 2007

(54) METERING DEVICE FOR A NOZZLE OF A HOT RUNNER INJECTION MOLDING APPARATUS

(75) Inventors: Isao Okamura, Sagamihara (JP); George Olaru, Skaneateles, NY (US)

(73) Assignee: Mold-Masters Limited, Georgetown (CA)

( * ) Notice: Subject to any disclaimer, the term of this patent is extended or adjusted under 35 U.S.C. 154(b) by 0 days.

(21) Appl. No.: 11/113,359

(22) Filed: Apr. 25, 2005

(65) Prior Publication Data

US 2005/0266117 A1   Dec. 1, 2005

Related U.S. Application Data

(63) Continuation of application No. 10/245,723, filed on Sep. 18, 2002, now Pat. No. 6,884,061.

(51) Int. Cl.
  *B29C 45/27*   (2006.01)
(52) U.S. Cl. .................. 425/557; 264/328.19; 425/261; 425/264; 425/559
(58) Field of Classification Search ................ 425/557, 425/559, 261, 264; 264/328.19
  See application file for complete search history.

(56) References Cited

U.S. PATENT DOCUMENTS

| | | |
|---|---|---|
| 3,374,502 A | 3/1968 | Lazzara |
| 3,390,433 A | 7/1968 | Barnett et al. |
| 3,417,433 A | 12/1968 | Teraoka |
| 3,807,914 A | 4/1974 | Paulson et al. |
| 3,819,313 A | 6/1974 | Josephsen et al. |
| 3,861,841 A | 1/1975 | Hanning |
| 4,279,582 A | 7/1981 | Osuna-Diaz |
| 4,380,426 A | 4/1983 | Wiles |
| 4,420,452 A | 12/1983 | van Dalen et al. |
| 4,657,496 A | 4/1987 | Ozeki et al. |
| 4,717,324 A | 1/1988 | Schad et al. |
| 4,723,898 A | 2/1988 | Tsutsumi |
| 4,863,369 A | 9/1989 | Schad et al. |

(Continued)

FOREIGN PATENT DOCUMENTS

CN    2527427 Y    12/2002

(Continued)

OTHER PUBLICATIONS

European Search Report for International Application No. EP 03 02 7790, dated Mar. 30, 2004.

(Continued)

*Primary Examiner*—Tim Heitbrink
(74) *Attorney, Agent, or Firm*—Medler Ferro PLLC

(57) ABSTRACT

An injection molding apparatus includes an injection piston that is slidable within a nozzle having a movable valve gate pin. The injection piston is movable from a retracted position to an extended position in order to force melt towards a mold cavity. A valve is located at a forward end of the piston to selectively block communication between a recess, which is provided in an outer wall of the piston adjacent the valve, and a melt chamber of the nozzle. Movement of the injection piston from the retracted position to the extended position causes the valve to close so that the predetermined volume of melt located below the valve is forced into the mold cavity, when the valve gate pin opens the mold gate.

20 Claims, 8 Drawing Sheets

U.S. PATENT DOCUMENTS

| | | | |
|---|---|---|---|
| 5,028,226 A | 7/1991 | De'ath et al. | |
| 5,043,129 A | 8/1991 | Sorensen | |
| 5,112,212 A | 5/1992 | Akselrud et al. | |
| 5,141,696 A | 8/1992 | Osuna-Diaz | |
| 5,143,733 A | 9/1992 | Von Buren et al. | |
| 5,149,547 A | 9/1992 | Gill | |
| 5,192,555 A | 3/1993 | Arnott | |
| 5,200,207 A | 4/1993 | Akselrud et al. | |
| 5,200,527 A | 4/1993 | Griffiths et al. | |
| 5,223,275 A | 6/1993 | Gellert | |
| 5,238,378 A | 8/1993 | Gellert | |
| 5,260,012 A | 11/1993 | Arnott | |
| 5,299,928 A | 4/1994 | Gellert | |
| 5,389,315 A | 2/1995 | Yabushita | |
| 5,454,995 A | 10/1995 | Rusconi et al. | |
| 5,478,520 A * | 12/1995 | Kasai et al. | 264/328.1 |
| 5,556,582 A | 9/1996 | Kazmer | |
| 5,582,851 A | 12/1996 | Hofstetter et al. | |
| 5,605,707 A * | 2/1997 | Ibar | 425/557 |
| 5,650,178 A | 7/1997 | Bemis et al. | |
| 5,762,855 A | 6/1998 | Betters et al. | |
| 5,766,654 A | 6/1998 | Groleau | |
| 5,773,038 A | 6/1998 | Hettinga | |
| 5,814,358 A | 9/1998 | Bock | |
| 5,849,236 A | 12/1998 | Tatham | |
| 5,891,381 A | 4/1999 | Bemis et al. | |
| 5,894,023 A | 4/1999 | Schramm et al. | |
| 5,919,492 A | 7/1999 | Tarr et al. | |
| 5,935,614 A | 8/1999 | Blank et al. | |
| 6,045,740 A * | 4/2000 | Gorlich | 425/557 |
| 6,062,840 A | 5/2000 | Lee et al. | |
| 6,090,318 A | 7/2000 | Bader et al. | |
| 6,099,767 A | 8/2000 | Tarr et al. | |
| 6,228,309 B1 | 5/2001 | Jones et al. | |
| 6,245,278 B1 | 6/2001 | Lausenhammer et al. | |
| 6,254,377 B1 | 7/2001 | Kazmer et al. | |
| 6,261,075 B1 | 7/2001 | Lee et al. | |
| 6,287,107 B1 | 9/2001 | Kazmer et al. | |
| 6,294,122 B1 | 9/2001 | Moss et al. | |
| 6,309,208 B1 | 10/2001 | Kazmer et al. | |
| 6,343,921 B1 | 2/2002 | Kazmer et al. | |
| 6,343,922 B1 | 2/2002 | Kazmer et al. | |
| 6,361,300 B1 | 3/2002 | Kazmer et al. | |
| 6,464,909 B1 | 10/2002 | Kazmer et al. | |
| 6,558,603 B2 * | 5/2003 | Wobbe et al. | 425/561 |
| 6,683,283 B2 | 1/2004 | Schmidt | |
| 6,699,422 B1 | 3/2004 | Stemke | |
| 6,884,061 B2 * | 4/2005 | Okamura et al. | 425/557 |
| 2002/0071888 A1 | 6/2002 | Bouti | |
| 2002/0121713 A1 | 9/2002 | Moss et al. | |
| 2003/0071817 A1 | 4/2003 | Sidwell | |
| 2003/0170340 A1 | 9/2003 | Slcilia et al. | |
| 2003/0224086 A1 | 12/2003 | Olaru | |
| 2004/0071817 A1 | 4/2004 | Fischer et al. | |
| 2004/0109916 A1 | 6/2004 | Babin | |
| 2005/0079242 A1 | 4/2005 | Schmidt | |

FOREIGN PATENT DOCUMENTS

| | | |
|---|---|---|
| DE | 19802048 A1 | 7/1999 |
| EP | 0 393 389 | 10/1990 |
| EP | 0624449 A2 | 11/1994 |
| EP | 0624449 A3 | 11/1994 |
| EP | 0 901 896 A3 | 3/1999 |
| EP | 0901896 A2 | 3/1999 |
| EP | 0967063 A1 | 12/1999 |
| EP | 1013395 A1 | 6/2000 |
| EP | 1 426 160 A1 | 6/2004 |
| EP | 1 447 200 A2 | 8/2004 |
| JP | 58-142833 | 8/1983 |
| JP | 60-212321 | 10/1985 |
| JP | 63-166511 | 7/1988 |
| JP | 4-348923 | 12/1992 |
| JP | 5-104580 | 4/1993 |
| JP | 6-8285 | 1/1994 |
| JP | 6-166072 | 6/1994 |
| JP | 7-40400 | 2/1995 |
| JP | 7-266379 | 10/1995 |
| JP | 9-1600 | 1/1997 |
| JP | 9-39033 | 2/1997 |
| JP | 9-141688 | 6/1997 |
| JP | 11-5232 | 1/1999 |
| WO | WO 98/56564 | 12/1998 |
| WO | WO99/54109 | 10/1999 |
| WO | WO 00/35655 | 6/2000 |
| WO | WO 01/21377 | 3/2001 |
| WO | WO 01/36174 | 5/2001 |
| WO | WO 01/60580 | 8/2001 |
| WO | WO 02/36324 | 5/2002 |
| WO | WO 03/057448 | 7/2003 |

OTHER PUBLICATIONS

"Pressure and Temperature Control of Multicavity Injection Mold With Hydraulic Valve Gate Hot Mold System," No. 301, p. 333, Research Disclosure, Kenneth Mason Publication, Hampshire, GB, May 1989, ISSN: 0374-4353.

"The Five Step Process"—An Industry Standard Process for Diagnosing and Isolating Cavity Variations in Multi-Cavity injection Molds, Beaumont Runner Technologies, Inc. http://www.meltflipper.com/fivestep/fivestep.html; dated: Mar. 15, 2004.

"Micromolding Sizing Up the Challenges" by Mikell Knights, Senior Editor, Plastics Technology, http:/www.plasticstechnology.com; dated: Nov. 23, 2001.

Sensors and Data Acquisition for Injection Molding Cavity Pressure and Temperature Sensor and DataFlow; Kistler Japan Co. . Ltd.; http://www.Kistler.co.jp; 2003.

Tooling Innovations for Thermoset Molding; Nunnery et al.; www.bulkmolding.com/technical-papers/tooling_thermosetmolding.pdf; 2003.

Ewikon Hotrunner Systems for large parts; May 2000.

SG-Link™ Wireless Strain Gauge System, www.microstrain.com; dated: Apr. 29, 2004.

* cited by examiner

METERING DEVICE FOR A NOZZLE OF A HOT RUNNER INJECTION MOLDING APPARATUS

This application is a continuation of Ser. No. 10/245,723 filed Sep. 18, 2002, now U.S. Pat. No. 6,884,061.

FIELD OF THE INVENTION

The present invention relates generally to an injection molding apparatus, and in particular to a metering device for a hot runner nozzle, which injects a predetermined quantity of melt into a mold cavity.

BACKGROUND OF THE INVENTION

In an injection molding apparatus, a manifold receives a pressurized melt stream from a machine nozzle. The manifold distributes the melt stream to a plurality of nozzles and the melt is forced through the nozzles and into a plurality of mold cavities. The melt is then cooled in the mold cavities and the molded parts are released so that another cycle can begin.

The amount of melt transferred to each nozzle can vary due to effects such as shear induced flow imbalance in the manifold, for example. In order to compensate for such effects and ensure that a sufficient amount of melt is delivered to each mold cavity, the pressure applied to the melt stream by the machine nozzle must be very high. For applications such as injection molding of thin walled vessels and micro-molding, even higher nozzle pressures are required in order to produce quality molded products. As a result, the machine nozzle must be very large in order to generate sufficient pressure to properly distribute the melt to the mold cavities. In many cases, however, increasing the size of the machine nozzle is not a practical solution. Alternative solutions for increasing the pressure generated in each individual nozzle are therefore desirable.

Precise measurement of the volume of melt transferred in each shot for thin walled molded parts and micro-molded parts is also very important. This presents a unique challenge particularly when dealing with micro molded parts, which typically weigh a fraction of a gram. Several prior art devices have been developed to control the volume of melt that is injected into a mold cavity. These devices have typically been employed when injecting more than one material into a single mold cavity and tend to be complex and costly to manufacture.

U.S. Pat. No. 5,112,212 to Akselrud et al. discloses a shooting pot, which is used as a metering device, for use in a co-injection molding apparatus. The shooting pot is located remote from the hot runner nozzle and is used to control the volume of one of the two molten materials injected into the cavity. The shooting pot includes a piston that is axially movable within a cylinder to force molten material from the cylinder into a nozzle, which leads to a mold cavity. The cylinder includes an inlet that delivers melt from a melt source to a reservoir, which is located in a lower end of the piston. The piston is rotatable to move the reservoir out of communication with the inlet to seal it off so that when the piston is lowered, a known volume of melt is forced into the mold cavity.

U.S. Pat. No. 4,863,369 to Schad et al. discloses an injection molding apparatus that uses a shooting pot to deliver a precisely measured quantity of melt to a mold cavity. A valve is located in a conduit between a melt source and each nozzle. Once the shooting pot and nozzle are filled with melt, the valve is closed and the mold gate is opened. A piston of the shooting pot advances until it bottoms out in a cylinder to deliver a precise quantity of melt to a mold cavity.

A disadvantage of shooting pots that are remotely located from the nozzle and the mold cavity is that the known or measured volume of melt may vary from one molding cycle to the next. This occurs because there is a large volume of melt that is located between the shooting pot and the mold cavity i.e. the melt in the nozzle, the melt in the manifold channel and the melt in the shooting pot. This large volume of melt introduces several variables. Minor deviations in temperature or pressure, for example, may result in significant variations of the known volume. The sizable distance between the shooting pot and the mold cavity further causes the melt to have a long residence time outside of the nozzle between the injection of one article to the next. This results in molded parts that are not of the highest quality because the temperature of the melt coming from the shooting pot may be either under heated or over heated.

It is therefore an object of the present invention to provide a metering device for a nozzle of an injection molding apparatus, which obviates or mitigates at least one of the above disadvantages.

SUMMARY OF THE INVENTION

According to one aspect of the present invention there is provided an injection molding apparatus comprising:

a manifold having a manifold channel for receiving a melt stream of moldable material under pressure, the manifold channel having an outlet for delivering the melt stream to a nozzle channel of a nozzle;

a mold cavity receiving the melt stream from the nozzle, the nozzle channel communicating with the mold cavity through a mold gate;

a gating mechanism for selectively closing the mold gate;

a piston extending through the nozzle channel of the nozzle and being slidable therethrough, an outer wall of the piston abutting an inner wall of the nozzle channel, the piston being movable from a retracted position to an extended position to force melt towards the mold cavity;

a valve located at a forward end of the piston, the valve being selectively movable to block communication between a recess, which is provided in the outer wall of the piston adjacent the valve, and a melt chamber of the nozzle channel, the valve being open to allow melt to flow from the manifold channel into the recess and into the melt chamber of the nozzle channel when the piston is in the retracted position;

wherein movement of the piston towards the extended position forces melt located in the melt chamber of the nozzle channel to flow into the mold cavity.

According to another aspect of the present invention there is provided a method for forcing melt into a mold cavity of an injection molding apparatus, the method comprising:

closing a mold gate of the mold cavity to block a melt stream from flowing from a nozzle channel of a nozzle into the mold cavity;

maintaining a piston located in the nozzle channel in a retracted position, in which a valve located at a forward end of the piston is open to enable the melt stream to flow from a manifold channel of a manifold, through a recess provided adjacent the forward end of the piston into a melt chamber of the nozzle channel, to fill the nozzle channel with melt;

closing the valve to block flow of the melt stream between the recess and the melt chamber of the nozzle channel;

opening the mold gate; and moving the piston towards an extended position to force the melt located in the melt chamber of the nozzle channel into the mold cavity.

According to another aspect of the present invention there is provided a piston for a nozzle of an injection molding apparatus comprises:

a valve located on a forward end of the piston, the valve being selectively closable to block communication between a-recess, which is provided in the outer wall of the piston adjacent the valve, and a melt chamber of a nozzle channel; and wherein the valve is open to allow melt to flow from the recess past the valve when the piston is in a retracted position and the valve is closed when the piston is moved toward an extended position in order to force melt into a mold cavity.

According to yet another aspect of the present invention there is provided an injection molding apparatus comprising:

a manifold having a manifold channel for receiving a melt stream of moldable material under pressure, the manifold channel having an outlet for delivering the melt stream to a nozzle channel of a nozzle;

a mold cavity receiving the melt stream from the nozzle channel, the nozzle channel communicating with the mold cavity through a mold gate;

a gating mechanism for selectively closing the mold gate;

a melt chamber located in the nozzle channel adjacent the mold gate, the melt chamber having a predetermined volume;

a valve located between the outlet of the manifold channel and the melt chamber, the valve being selectively movable to control melt flow from the manifold channel into the melt chamber; and wherein the predetermined volume of melt is injected into the mold cavity in a single shot.

According to still another embodiment of the present invention there is provided a method of injecting a predetermined volume of a molten material into a mold cavity comprising:

a) injecting molten material through a hot runner manifold into a valve gated hot runner nozzle including a movable valve pin, where the valve pin is in the closed position engaging a mold gate;

b) opening the mold gate;

c) injecting the molten material into a mold cavity through the mold gate by moving an injection piston located at least partially in the nozzle to transfer the predetermined volume of molten material from the hot runner nozzle into the mold cavity.

d) closing the communication between the hot runner nozzle and the mold cavity by moving the valve pin into engagement with the mold gate.

According to another embodiment of the present invention there is provided a method of injecting a predetermined volume of a molten material into a mold cavity comprising:

a) injecting molten material through a hot runner manifold into a valve gated hot runner nozzle including a movable valve pin, where the valve pin is in the closed position engaging a mold gate;

b) blocking communication between the hot runner manifold and the hot runner nozzle;

c) opening the mold gate;

d) moving an injection piston located at least partially in the nozzle toward the mold gate to transfer the predetermined volume of molten material from the hot runner nozzle into the mold cavity;

e) closing the communication between the nozzle and the mold cavity by moving the valve pin into engagement with the mold gate.

The present invention provides an advantage in that a metered quantity of melt is delivered consistently to a mold cavity.

BRIEF DESCRIPTION OF THE DRAWINGS

Embodiments of the present invention will now be described more fully with reference to the accompanying drawings.

DETAILED DESCRIPTION OF THE PREFERRED EMBODIMENT

Figure 1:
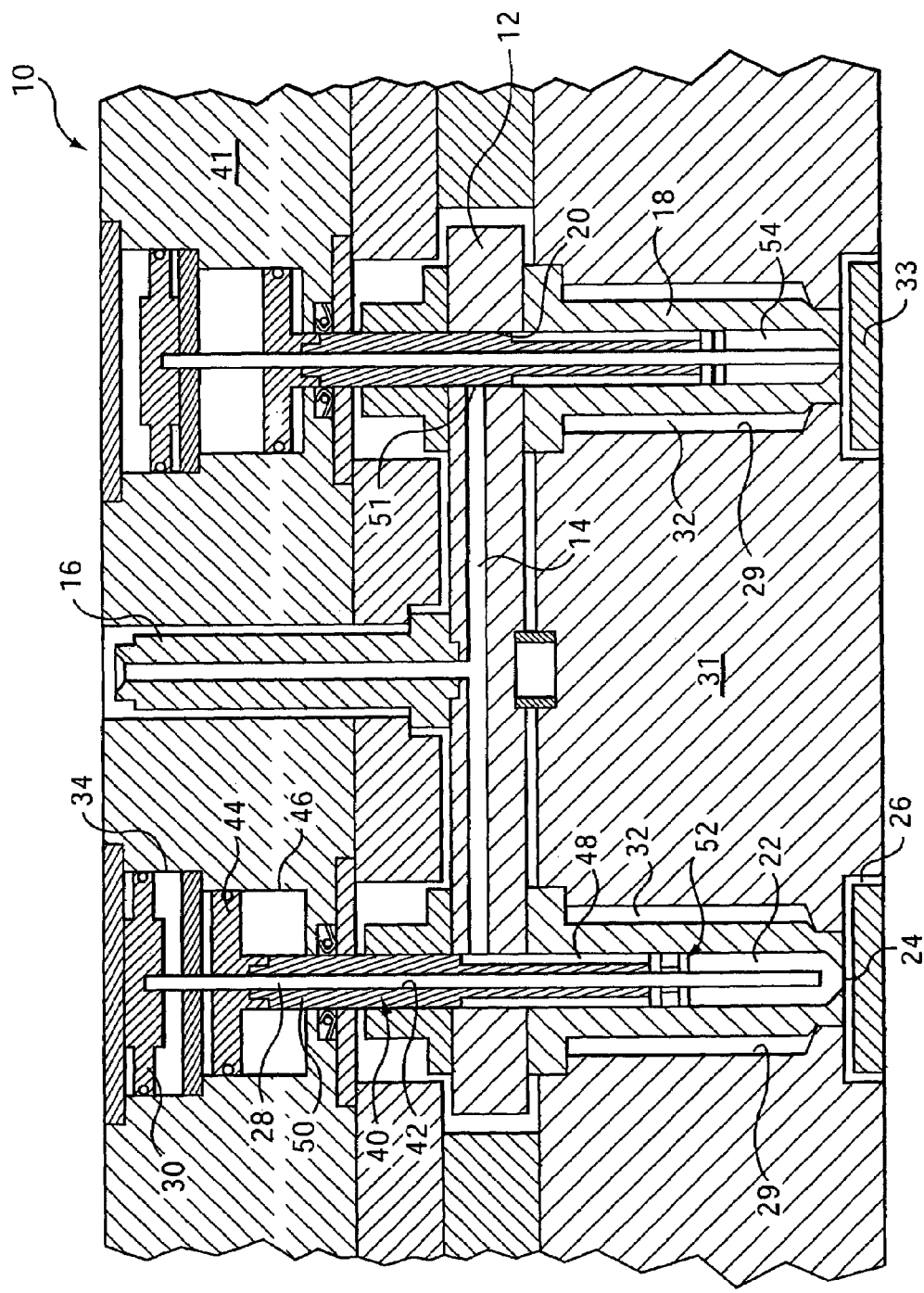
FIG. 1 is a side sectional view of an injection molding apparatus of the present invention.

Referring to FIG. 1, portions of a hot runner injection molding apparatus are generally shown at 10. The injection molding apparatus 10 comprises a manifold 12 having a manifold melt channel 14 for receiving a melt stream of moldable material under pressure from a manifold bushing 16. Manifold 12 is positioned between a back plate 41 and a mold cavity plate 31, such that manifold bushing 16 extends through back plate 41 and is in communication with a machine nozzle of an injection molding machine (not shown). Bores 20 extend through the manifold 12 at distal ends of the manifold melt channel 14. The bores 20 are in communication with the manifold melt channel 14 and extend generally perpendicular thereto.

Hot runner nozzles 18 are coupled to a lower surface of the manifold 12 and are positioned within nozzle bores 29 in mold cavity plate 31 such that an insulative air space 32 is provided between hot runner nozzles 18 and mold cavity plate 31. A nozzle channel 22 of each nozzle 18 is aligned with a respective bore 20 to receive the melt stream of moldable material from the manifold 12. A mold gate 24 is located adjacent a nozzle tip of each nozzle 18. The mold gates 24 are openable to allow delivery of the melt stream to respective mold cavities 26 that are respectively formed between mold cavity plate 31 and movable mold cores 33. Any number of nozzles 18 can be used to feed either a single or a plurality of mold cavities 26. The mold cavities 26 may be of the same size and shape or they may differ. Manifold heaters (not shown) and nozzle heaters (not shown) maintain the melt stream at a desired temperature and cooling channels (not shown) within mold cavity plate 31 facilitate cooling of the mold cavities 26.

A metering device in the form of a hot runner injection piston 40 is slidable through the bore 20 of the manifold 12 and the nozzle 18. A valve pin 28 extends through a central bore 42 of the injection piston 40 and is slidable therethrough to open and close the mold gate 24. The injection piston 40 and the valve pin 28 are driven independently and move relative to one another. The valve pin 28 is pneumatically driven by a valve piston 30 that is slidable in a cylinder 34. The injection piston 40 is pneumatically driven by a second piston 44 that is slidable in a second cylinder 46. The injection piston 40 and valve pin 28 are not limited to being driven pneumatically, they may be also driven hydraulically or by any other suitable means, including electrical and electromagnetic motors. In addition, the valve pin 28 may be replaced by another type of gating mechanism.

The injection piston 40 further comprises a piston body 50 that extends outwardly from the second piston 44. The piston body 50 is coupled to the second piston 44 by fasteners (not shown). Alternatively, the piston body 50 may be integral with the piston 44. The piston body 50 includes an outer surface 51, which blocks the communication between the manifold channel 14 and the nozzle channel 22 during movement of the piston body 50 towards the mold cavity 26. An annular recess 48 is provided in the outer surface 51 of the piston body 50. It will be appreciated that the annular recess 48 need not extend around the entire circumference of the outer surface 51. A valve, generally indicated at 52, is located at a forward end of the piston body 50 adjacent the recess 48. The valve 52 is openable to enable communication between the recess 48 and a melt chamber 54 of the nozzle channel 22. The melt chamber 54 of the nozzle channel 22 is located between the mold gate 24 and the valve 52. When the injection piston 40 is in the retracted position and the valve pin 28 is in the closed position, the volume of the melt in the melt chamber 54 of the nozzle 18 is known. The known volume of melt in the melt chamber 54 corresponds to the volume of melt to be injected into each mold cavity 26. The close proximity of the known volume of melt to be injected and the mold cavity 26 reduces the amount of variability experienced by prior art devices.

Figure 2:
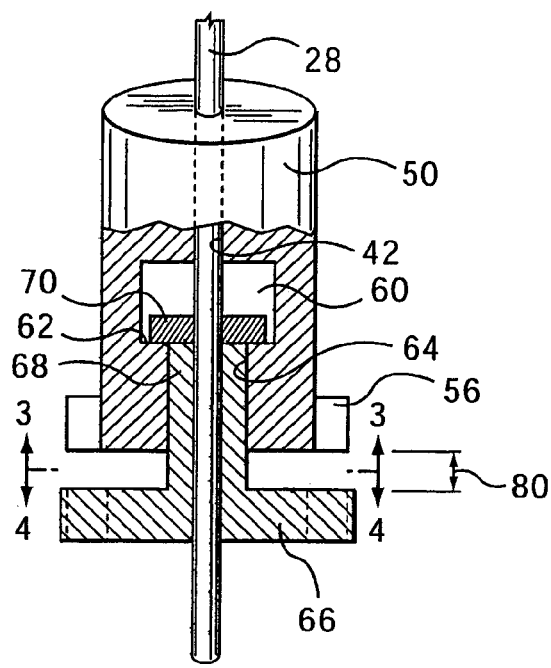
FIG. 2 is a side sectional view of a valve of a piston of FIG. 1.
Figure 3:
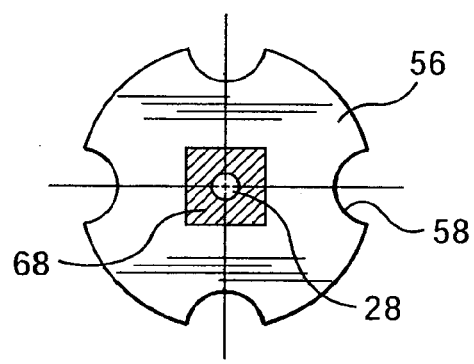
FIG. 3 is a view on 3—3 of FIG. 2.
Figure 4:
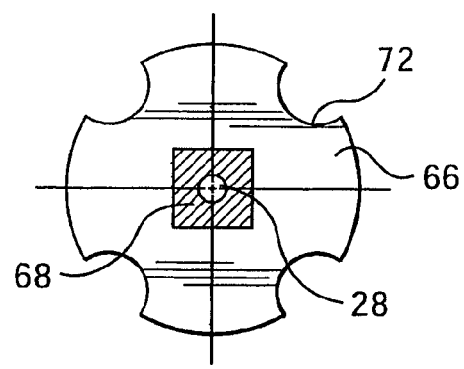
FIG. 4 is a view on 4—4 of FIG. 3.

Referring to FIGS. 2–4, the valve 52 is better illustrated. The valve comprises a flange 56 that extends outwardly from a lower end of the piston body 50. As shown in FIG. 3, the flange 56 includes a series of cutouts 58 that are spaced around the circumference thereof. A disc 66 is axially movable relative to the flange 56. The disc 66 includes a second series of cutouts 72 that are spaced around the circumference thereof. The disc 66 is oriented so that the second series of cutouts 72 is angularly offset from the series of cutouts 58 of the flange 56. The disc 66 and the flange 56 having the same outer diameter. This arrangement ensures that when the disc 66 abuts the flange 56, no melt can flow past the valve 52 in either direction so that the desired amount of melt, which is located in the melt chamber 54, is injected into the mold cavity 26.

The disc 66 further includes a stem 68 that extends outwardly therefrom and an enlarged head 70 that is mounted on the end of the stem 68. A central cavity 60 is provided in the lower end of the piston body 50 to receive the enlarged head 70 and limit the distance of travel thereof. The enlarged head 70 abuts a shoulder 62 of the central cavity 60 when the valve 52 is in the fully open position. The stem 68 is axially movable through a square-shaped bore 64 to reciprocate the disc 66 into and out of engagement with the flange 56. The square shape is used to prevent rotation of the disc 66 with respect to the flange 56. It will be appreciated that the stem 68 may be any shape or configuration that prevents rotation of the disc 66, for example, the stem 68 may be circular with a groove for receiving a dowel. The disc 66 is movable together with and independent of the piston body 50 as a result of the force exerted thereon by the melt in the nozzle channel. Retraction of the injection piston 40 causes the valve 52 to open by creating a gap 80 between the flange 56 and the disc 66, and extension of the injection piston 40 causes the valve 52 to close by eliminating the gap 80. Other arrangements may be used to provide a valve that performs the same function.

Figure 5:
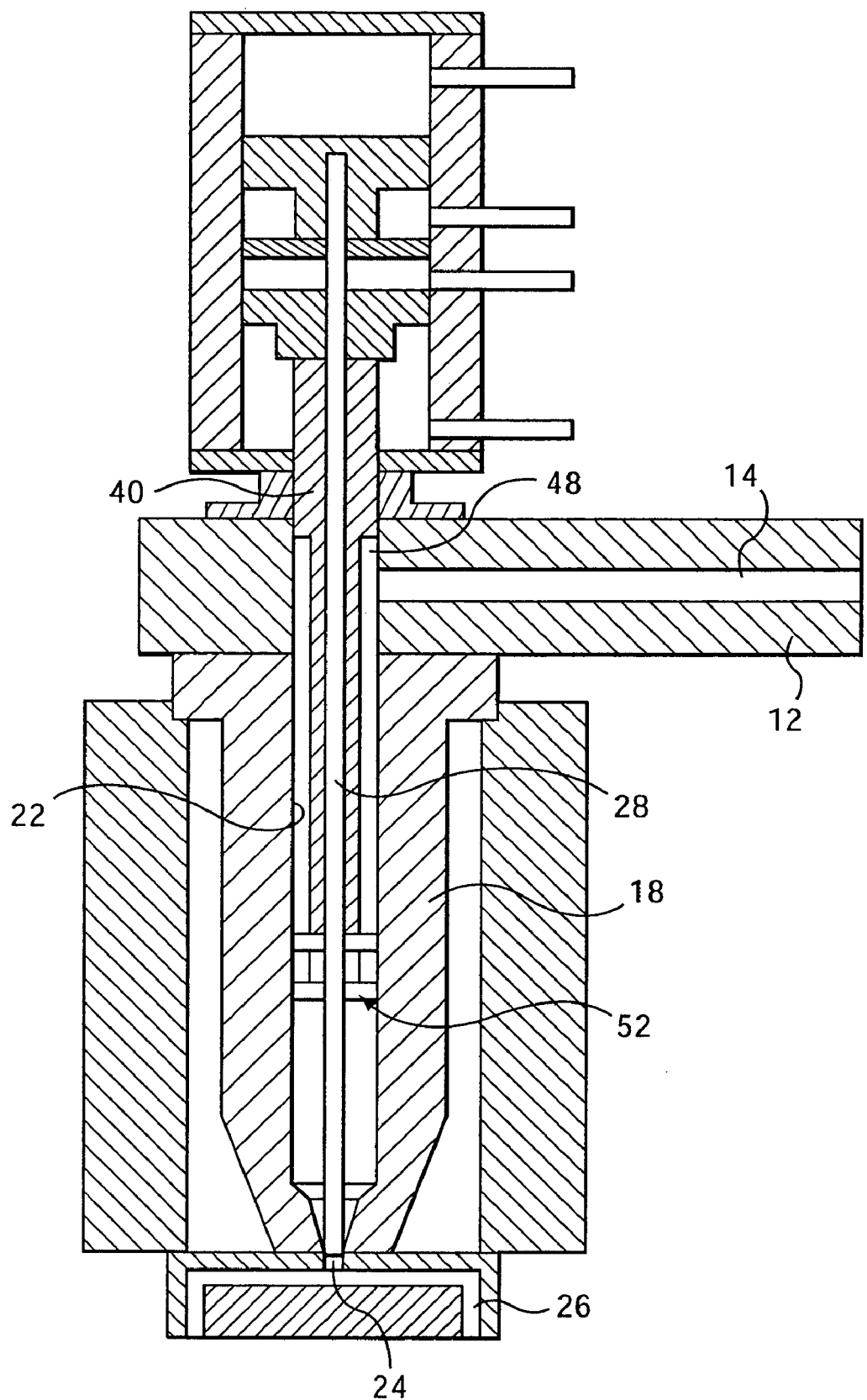
FIGS. 5 to 9 are schematic side views of a portion of FIG. 1 at different stages of the injection cycle.
Figure 6:
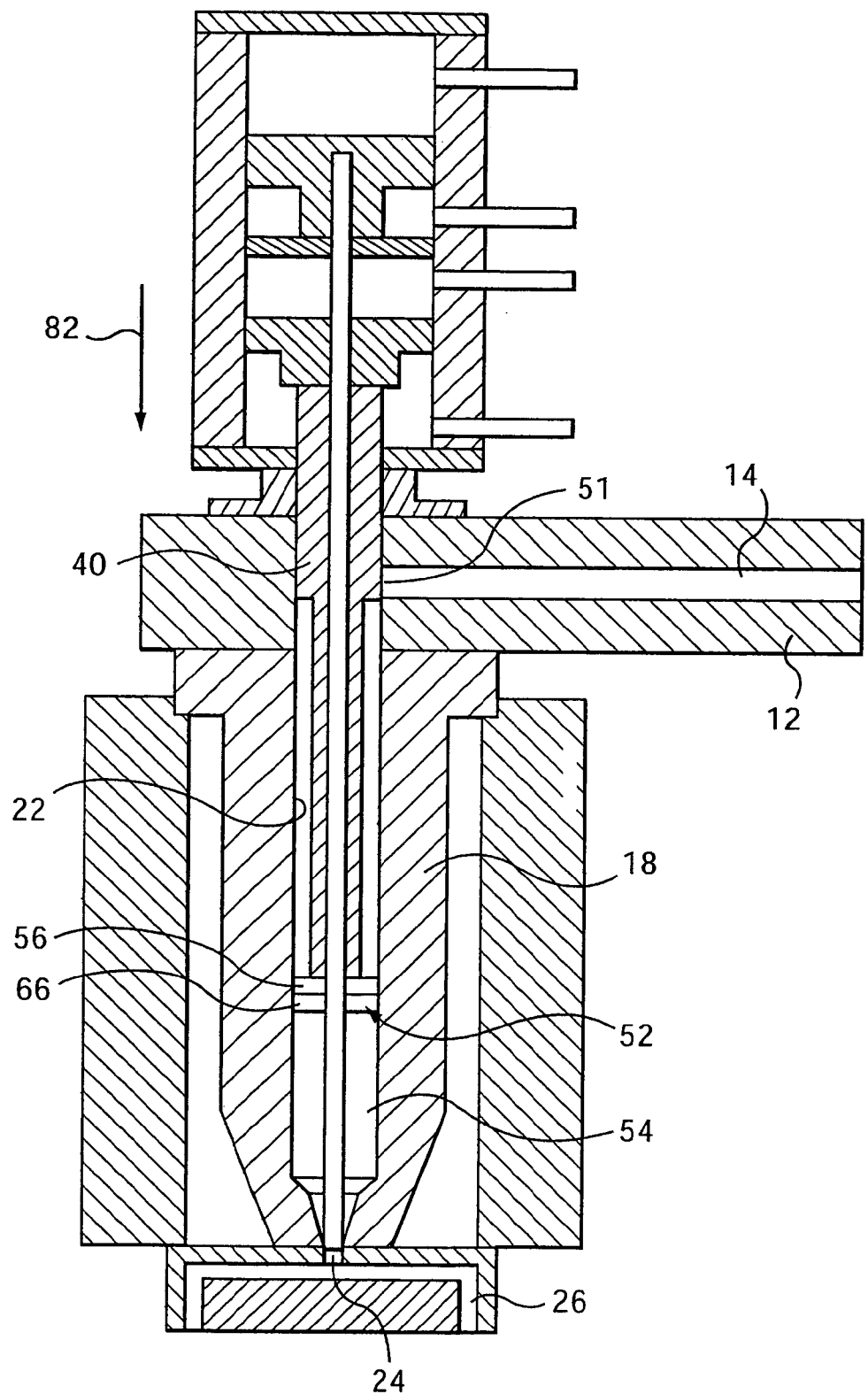
Figure 7:
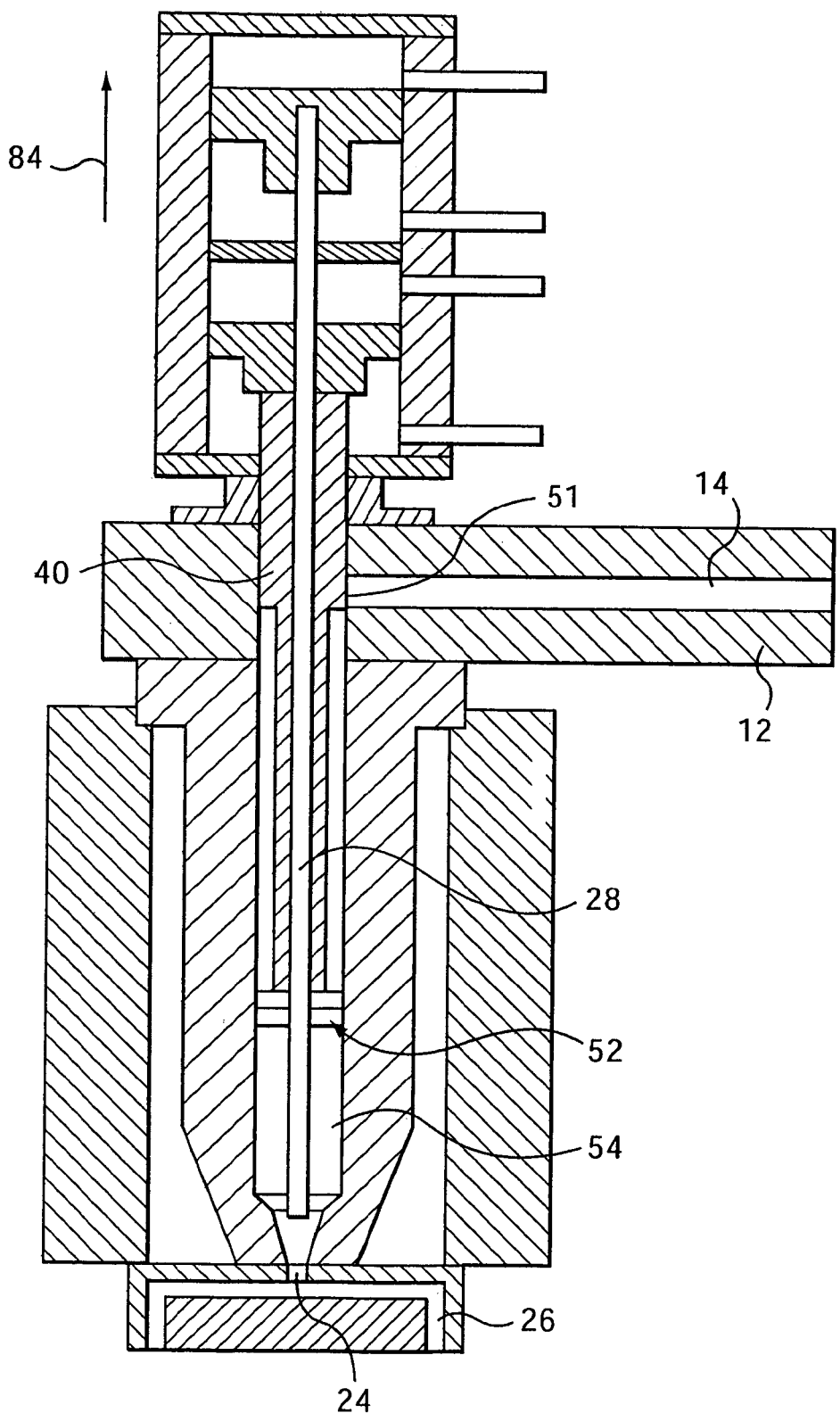
Figure 8:
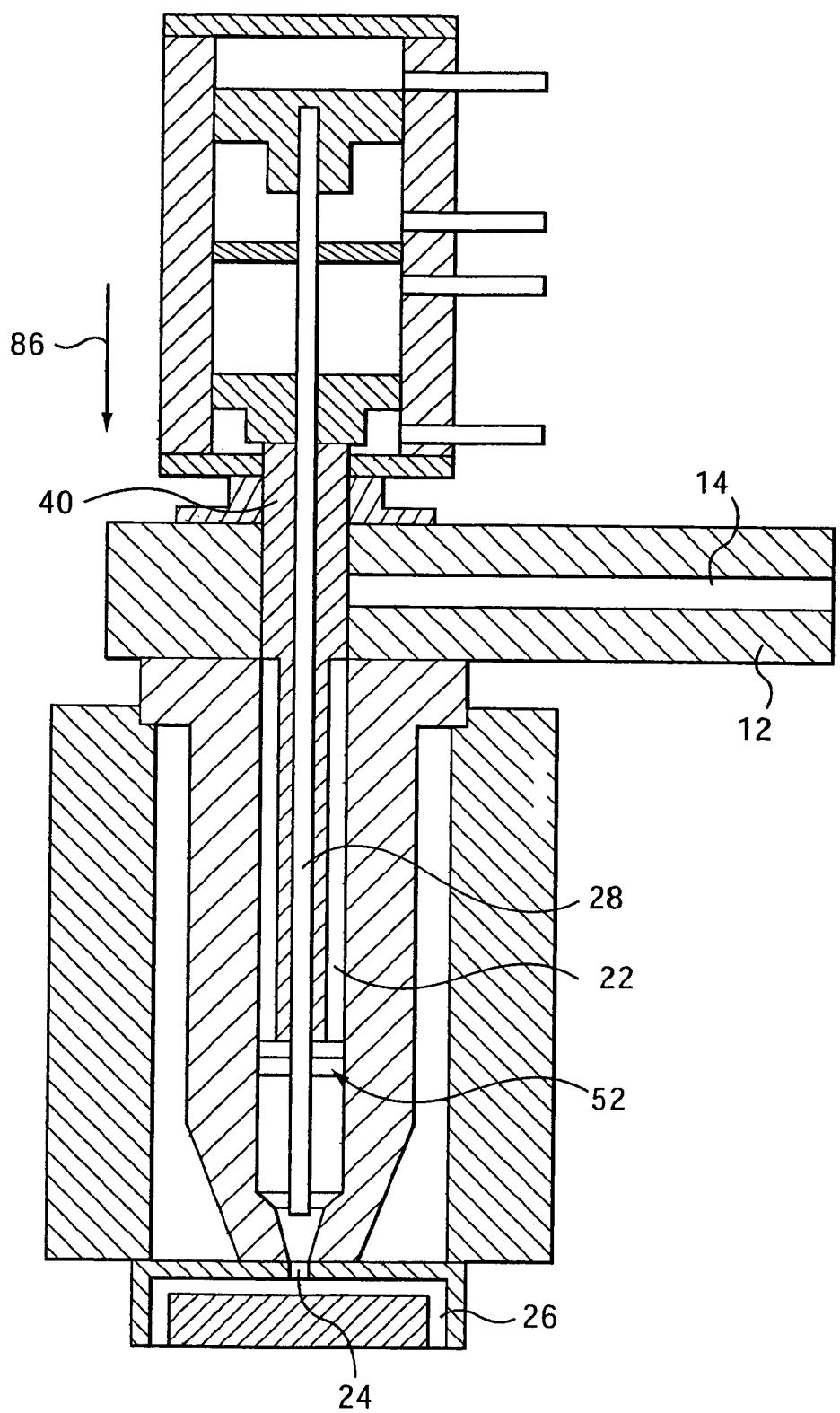
Figure 9:
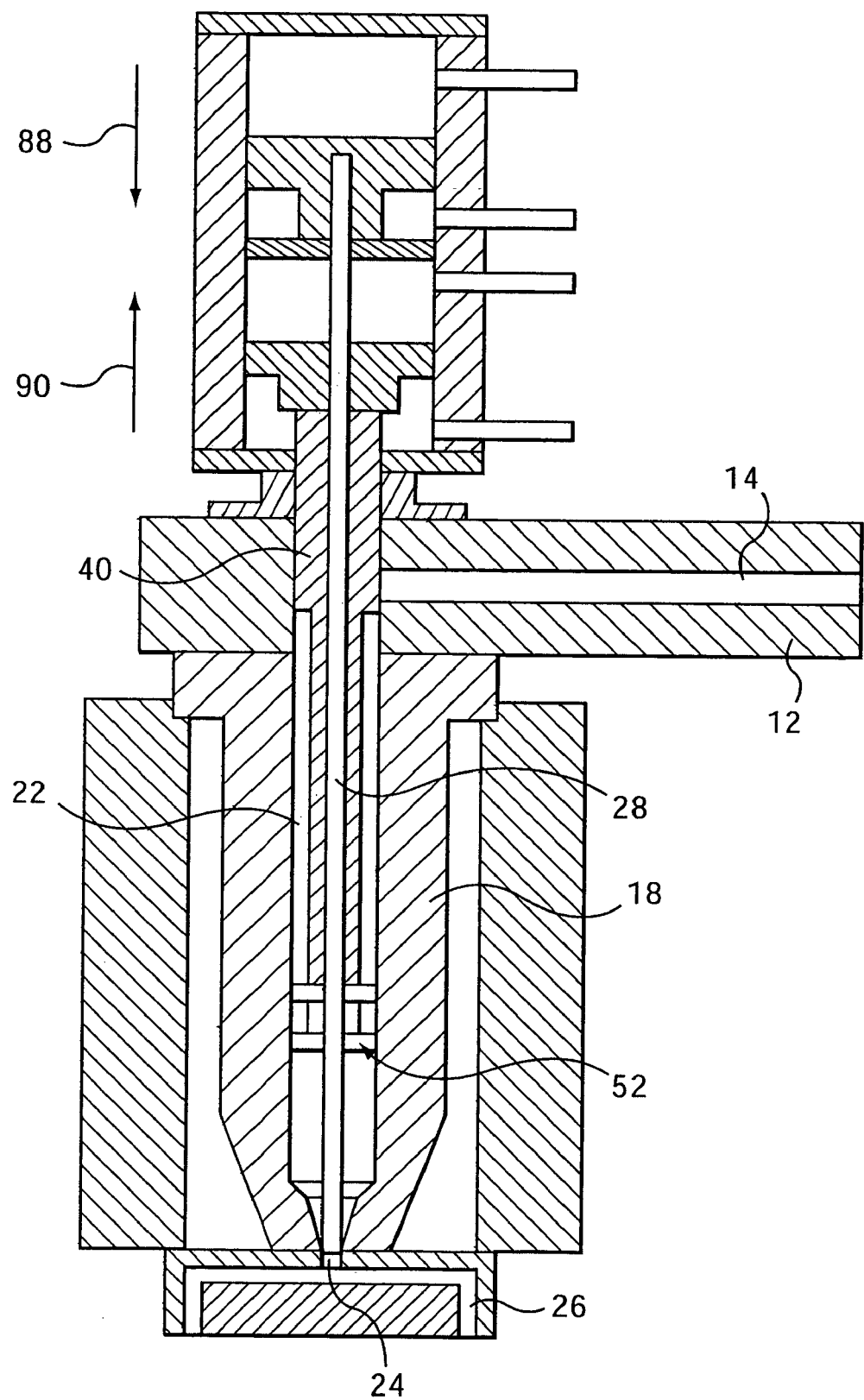

In operation, the pressurized melt stream flows through the manifold bushing 16 to the manifold channel 14 of the manifold 12. Referring to FIG. 5, the cycle begins with the mold gate 24 in the closed position, in which the valve pin 28 engages the mold gate 24, and the injection piston 40 in the retracted position. In the retracted position, the recess 48 is aligned with the manifold channel 14 to receive melt therefrom. The melt flows from the manifold 12 into the recess 48, which forces the valve 52 into the fully open position to allow melt to fill the nozzle channel 22. Once the nozzle 18 is full of melt, the injection piston 40 is moved toward the extended position as indicated by arrow 82 in FIG. 6. The forward movement of the injection piston 40 causes the disc 66 to be forced toward the flange 56 to close the valve 52. At the same time, the outer surface 51 of the piston body 50 shuts off communication between the manifold channel 14 and the nozzle channel 22. In this position, no additional melt can enter the melt chamber 54. Referring to FIG. 7, once the melt chamber 54 has been isolated from the rest of the nozzle channel 22, the mold gate 24 is opened by retracting the valve pin 28, as indicated by arrow 84. The forward stroke of the injection piston 40, indicated by arrow 86, then forces the melt located in the melt chamber 54 of the nozzle channel 22 into the mold cavity 26, as shown in FIG. 8. The mold gate 24 is then closed by extending the valve pin 28, as indicated by arrow 88 in FIG. 9, and the injection piston 40 returns to the retracted position, as indicated by arrow 90. This returns the injection piston 40 and valve pin 28 to the positions of FIG. 5 so that the cycle can be repeated. As will be appreciated, this arrangement ensures that the volume of melt injected into the mold cavity 26 is equal for each mold cavity 26 and is constant for every cycle.

Figure 10:
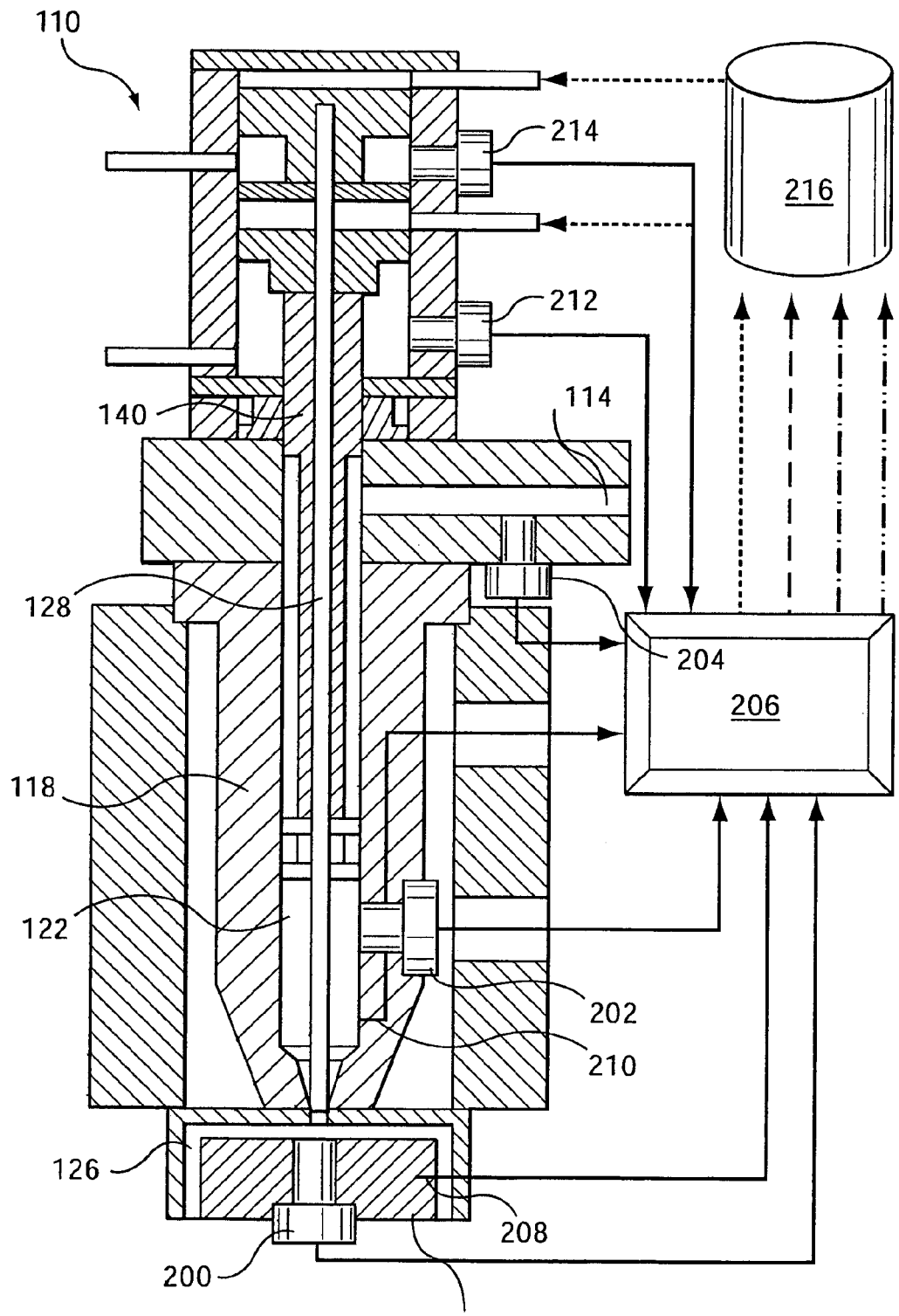
FIG. 10 is a schematic side sectional view of another embodiment of an injection molding apparatus of the present invention.

Referring to FIG. 10, another embodiment of an injection molding apparatus 110 is shown. The numerals used previously in describing FIG. 1 will be used again after raising the numerals by 100 where the parts to be described correspond to parts already described. The injection molding apparatus 110 is similar to the injection molding apparatus of FIG. 1 with the addition of pressure sensors 200, 202 and 204, which are provided in the mold cavity 126, the nozzle channel 122 and the manifold 114, respectively. The pressure sensors 200, 202 and 204 send information to the hot runner and mold controller 206 for use in controlling the timing and sequence of movements of the injection piston 140 and the valve pin 128. It will be appreciated that it is not necessary to use all three pressure sensors 200, 202, 204. If desired, only one or two of the pressure sensors 200, 202, 204 may be used.

Temperature sensors 208 and 210 are provided to measure the temperature of melt in the mold cavity 126 and in the nozzle 118, respectively. An additional sensor (not shown) may be provided in the manifold 112. Like the pressure sensors 200, 202, 204, the temperature sensors 208, 210 also send information to the controller 206 for use in controlling the timing and sequence of movements of the injection piston 140 and the valve pin 128. The controller 206 communicates with a motion drive 216 that, in turn, communicates with position sensors 212 and 214. The position sensors 212, 214 are used to control the position and movement of the injection piston 140 and the valve pin 128, respectively. The sensors may be of any known type, such as, for example, optical or inductive sensors. In some cases, only the position sensors 212 and 214 may be used for the purpose of simplifying the injection molding apparatus 110.

This arrangement is particularly useful in an injection molding apparatus 110 in which all of the cavities have the same size. The sensors 200, 202, 204 may be used to ensure that the pressure is generally equal in each of the mold cavities 126 and is generally equal between different batches of molded parts. The sensors 200, 202, 204 are also useful in the case of a family mold, in which the pressure in each mold cavity 126 is different and corresponds to a predetermined value.

Because a manifold typically supports more than one nozzle, it will be appreciated by a person skilled in the art that the movement of the individual pistons of each nozzle may be staggered so that the pressure from the machine nozzle can remain constant.

In a further embodiment, the mold cavities 26 are of different sizes. In order to fill each mold cavity 26 properly, the melt chamber 54 of each nozzle 18 must be sized to accommodate the correct volume of melt. The nozzles 18 associated with each mold cavity 26 are identical; however, each injection piston 40 must be sized accordingly.

Although a preferred embodiment of the present invention has been described, those of skill in the art will appreciate that variations and modifications may be made without departing from the spirit and scope thereof as defined by the appended claims.

We claim:

1. A hot runner injection molding apparatus comprising:
a manifold having a manifold channel;
a nozzle, coupled to the manifold, having a nozzle channel in fluid communication with the manifold channel, wherein the nozzle is positioned within a nozzle bore of a mold cavity plate;
an injection piston extending through the nozzle channel of the nozzle; and
a valve located at a forward end of the injection piston, wherein the valve is selectively adjustable to block fluid communication between a recess, which is provided in the outer wall of the injection piston upstream of the valve, and a melt chamber downstream of the valve within the nozzle channel.

2. A hot runner injection molding apparatus as defined in claim 1, further comprising:
a mold gate disposed downstream of the melt chamber; and
a gating mechanism driven by an actuation mechanism and adapted to open and close the mold gate.

3. A hot runner injection molding apparatus as defined in claim 2, wherein a predetermined volume of melt is located in the melt chamber of the nozzle channel when the gating mechanism is in a closed position.

4. A hot runner injection molding apparatus as defined in claim 2, wherein the gating mechanism is a valve pin driven by a piston.

5. A hot runner injection molding apparatus as defined in claim 2, wherein the valve is adapted to close when the injection piston is moved from a retracted position to an extended position.

6. A hot runner injection molding apparatus as defined in claim 5, wherein the valve is adapted to open when the injection piston is moved from the extended position to the retracted position.

7. A hot runner injection molding apparatus as defined in claim 6, further comprising:
a pressure sensor adapted to measure the pressure of the melt within the melt chamber; and
a controller connected to the pressure sensor, wherein movement of the injection piston is controlled by the controller in response to information received from the pressure sensor.

8. A hot runner injection molding apparatus as defined in claim 7, wherein the controller further receives information from a temperature sensor.

9. A hot runner injection molding apparatus as defined in claim 1, wherein a portion of an outer wall of the injection piston abuts a portion of an inner wall of the nozzle channel.

10. A hot runner injection molding apparatus comprising:
a manifold having a manifold channel;
a nozzle, positioned within a nozzle bore in a mold plate, having a nozzle channel in fluid communication with the manifold channel; and
an injection piston extending through the nozzle channel of the nozzle, wherein the injection piston includes,
a piston body having an outer wall with an upstream portion abutting an inner wall of the nozzle channel, wherein the outer wall includes a recess formed in a downstream portion of the outer wall, and
a valve located at a forward end of the piston body, the valve being selectively openable to allow fluid communication between the recess and a portion of the nozzle channel downstream of the valve.

11. A hot runner injection molding apparatus as defined in claim 10, wherein the injection piston is aligned within the nozzle channel such that movement of the injection piston to an extended position causes the upstream portion of the piston body to block fluid communication between the manifold channel and the nozzle channel.

12. A hot runner injection molding apparatus as defined in claim 10, further comprising:
a mold gate disposed downstream of the melt chamber; and
a gating mechanism driven by an actuation mechanism and adapted to open and close the mold gate.

13. A hot runner injection molding apparatus as defined in claim 12, wherein the gating mechanism is a valve pin that extends through the piston body.

14. A hot runner injection molding apparatus as defined in claim 10, wherein the recess in the downstream portion of the outer wall of the piston body is annular.

15. A nozzle for a hot runner injection molding apparatus comprising:
a nozzle body having a nozzle channel;
an injection piston extending within the nozzle channel, the injection piston including,
a piston body having a recess in an outer wall thereof, and
a valve located on a forward end of the piston body downstream of the recess, the valve being selectively closable to block fluid communication between the recess in the outer wall of the piston body and a portion of the nozzle channel downstream of the valve.

16. A nozzle as defined in claim 15, further comprising a gating mechanism extending through the nozzle channel.

17. A nozzle as defined in claim 16, wherein the gating mechanism is a valve pin selectively movable by an actuator.

18. A nozzle as defined in claim 17, wherein the valve pin is slidably receivable within a central bore of the injection piston.

19. A nozzle as defined in claim 17, wherein the piston body includes an upstream portion adapted to selectively block fluid communication between a melt source and the nozzle channel.

20. A nozzle as defined in claim 15, wherein an upstream portion of the piston body has a first diameter and a downstream portion of the piston body has a second diameter that is less than the first diameter such that the recess in the outer wall of the piston body is located in the downstream portion of the piston body and is annular.

* * * * *